(12) United States Patent
Kawasumi et al.

(10) Patent No.: US 6,576,360 B2
(45) Date of Patent: Jun. 10, 2003

(54) FUEL CELL SYSTEM AND METHOD

(75) Inventors: Emi Kawasumi, Yokohama (JP); Yasukazu Iwasaki, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 157 days.

(21) Appl. No.: 09/768,214

(22) Filed: Jan. 24, 2001

(65) Prior Publication Data
US 2001/0016274 A1 Aug. 23, 2001

(30) Foreign Application Priority Data
Jan. 25, 2000 (JP) ........................ 2000-015791

(51) Int. Cl.$^7$ .......................... H01M 8/00; H01M 8/04; H01M 8/12; H01M 2/00; H01M 2/02
(52) U.S. Cl. ............................ 429/22; 429/13; 429/23; 429/26; 429/34
(58) Field of Search .................. 429/22, 26, 23, 429/13, 34

(56) References Cited

U.S. PATENT DOCUMENTS 3,991,574 A * 11/1976 Frazier ...................... 60/645
4,622,275 A * 11/1986 Noguchi et al. ............. 429/19
5,658,681 A * 8/1997 Sato et al. ................... 429/13
6,063,515 A * 5/2000 Epp et al. .................... 429/17
6,280,867 B1 * 8/2001 Elias ........................... 429/34

FOREIGN PATENT DOCUMENTS

JP 08-273685 10/1996
JP 10-106607 4/1998

* cited by examiner

Primary Examiner—Patrick Ryan
Assistant Examiner—Julian Mercado
(74) Attorney, Agent, or Firm—Foley & Lardner (57) ABSTRACT

A fuel cell system includes an evaporator 80 composed of a cross type heat exchanger 16 adapted to produce fuel containing steam and methanol vapor that are evaporated with heating gas 18 exhausted from a combustor 20. The evaporator 80 has first and second heat exchanger sections 88 and 89 having respective evaporating heat transfer surfaces, and first and second liquid sump sections 82a and 84a formed in the vicinities of the respective heat transfer surfaces and having variable volumes, respectively. The evaporator 80 includes first and second volume control devices 90 and 92 that control the volumes of the liquid sump sections 82a and 84a such that fuel vapor is produced at a demanded amount to meet load variations of a vehicle.

16 Claims, 7 Drawing Sheets

FUEL CELL SYSTEM AND METHOD

BACKGROUND OF THE INVENTION

1. Field of the Invention

The present invention relates to a fuel cell system and method and, more particularly, to a fuel cell system and method that is highly responsive to varying loads.

2. Description of the Related Art

Figure 1:
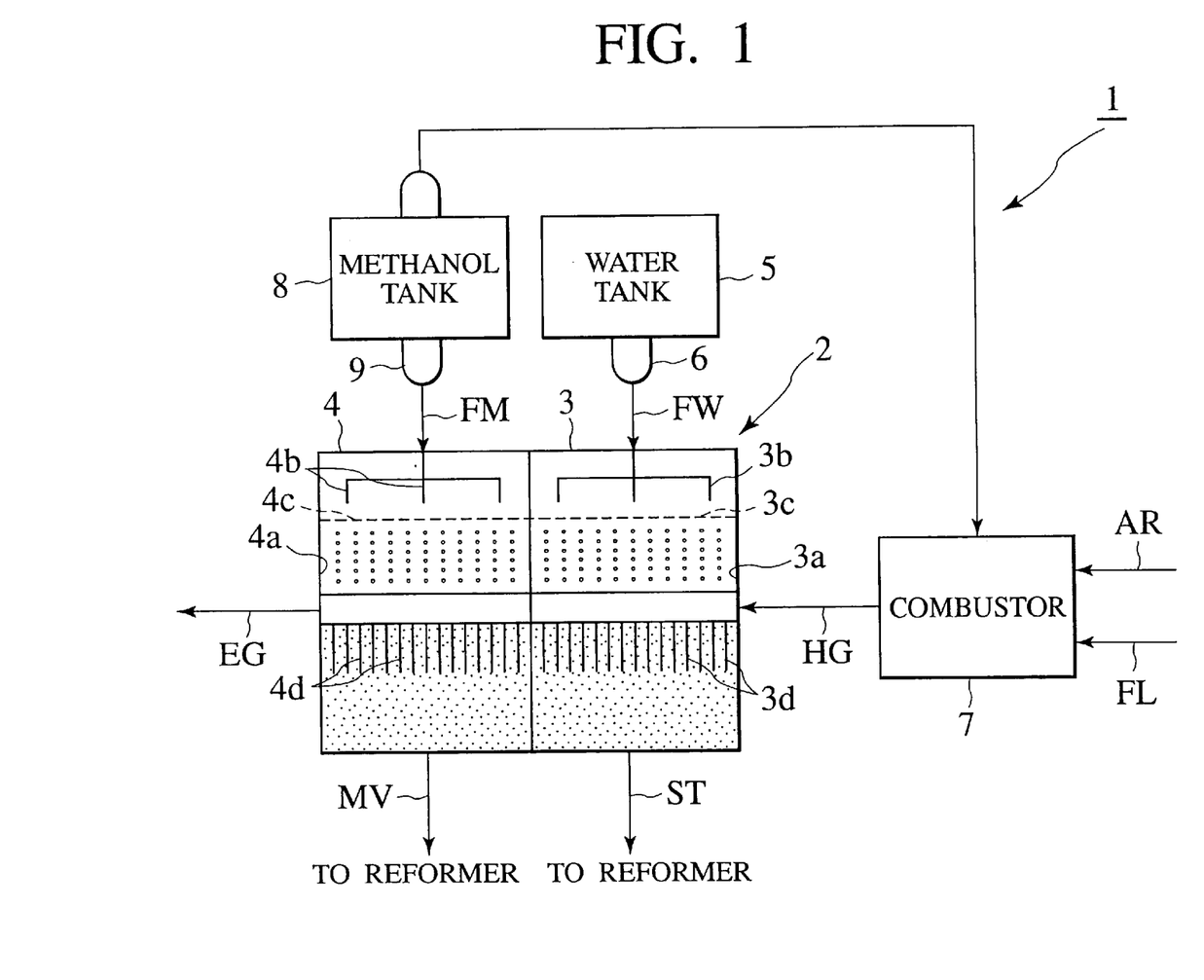
FIG. 1 is a schematic view of a fuel cell system having a cross type heat exchanger, which is investigated by the present inventors.

A fuel cell system including an evaporator as shown in FIG. 1 has been investigated by the present inventors.

In FIG. 1, an evaporator 1 includes a cross type heat exchanger 2. The cross type heat exchanger 2 includes a first cross type heat exchanger 3 for vaporizing water to generate steam ST, and a second cross type heat exchanger 4 for vaporizing methanol to produce methanol vapor MV.

The first cross type heat exchanger 3 includes a heat exchanging chamber 3a, a plurality of water injection nozzles 3b adapted to be supplied with the water from a water tank 5 via a water feed pump 6, a water dispersion panel 3c on which water is accumulated, and a heat exchanger section 3d disposed at an intermediate area of the heat exchanging chamber 3a.

The heat exchanger section 3d communicates with a combustor 7 to receive heating gas exhausted therefrom for generating the steam ST by heating water FW with heating gas HG. The combustor combusts air AR and fuel F1 to produce the heating gas HG. The steam ST is then supplied to a reformer.

Likewise, the second cross type heat exchanger 4 includes a heat exchanging chamber 4a having a plurality of methanol injection nozzles 4b adapted to be supplied with methanol from a methanol tank 8 via a methanol feed pump 9, a methanol dispersion panel 4c, and a heat exchanger section 4d communicating with the combustor 7 to receive the heating gas HG for generating the methanol vapor MV, that is supplied to the reformer.

SUMMARY OF THE INVENTION

In such an evaporator employed in the fuel cell system discussed above, however, feed water is sprayed onto the dispersion panel 3c by the water injection nozzles 3b and is supplied to an evaporating heat transfer surface of the heat exchanger section 3d. With such a structure, a certain time interval is required to accumulate feed water on areas above the dispersion panel 3c and, therefore, a delay time exists before a necessary amount of steam is obtained. Such a situation is the same as in the case that a necessary amount of methanol vapor is to be obtained.

The present invention has been made in view of the inadequacies as above investigated and has an object to provide a fuel cell system and method which overcomes and eliminates such inadequacies, that is, to provide a fuel cell system including an evaporator which is highly responsive to varying loads of a vehicle and method therefor.

To achieve the above object, a fuel cell system of the present invention is provided with a fuel cell generating electric power; a combustor producing heating gas; an evaporator including an evaporating heat transfer surface evaporating fuel with the heating gas to produce fuel vapor, the evaporator including a liquid sump section located in the vicinity of the evaporating heat transfer surface and having a variable volume; a volume control device associated with the liquid sump section to control the volume thereof such that a demanded amount of the fuel vapor is obtained; and a reformer reforming the fuel vapor to produce reformed gas. Here the fuel cell is supplied with the reformed gas and a gas containing oxygen to generate the electric power.

In other words, a fuel cell system of the present invention is provided with a fuel cell generating electric power; a combusting means for producing heating gas; an evaporating means for evaporating fuel with the heating gas to produce fuel vapor, the evaporating means including a liquid sump section located in the vicinity of the evaporating heat transfer surface and having a variable volume; a volume control means, associated with the liquid sump section, for controlling the volume thereof such that a demanded amount of the fuel vapor is obtained; and a reforming means for reforming the fuel vapor to produce reformed gas. Here, the fuel cell is supplied with the reformed gas and a gas containing oxygen to generate the electric power.

Beside, a controlling method of a fuel cell system of the present invention produces heating gas; evaporates fuel in a liquid sump section of the fuel cell system with the heating gas to produce fuel vapor, while controlling a volume of the liquid sump section such that a demanded amount of the fuel vapor is obtained; reforms the fuel vapor to produce reformed gas; and supplies the reformed gas and a gas containing oxygen such that the fuel cell generates electric power.

Other and further features, advantages, and benefits of the present invention will become more apparent from the following description taken in conjunction with the following drawings. It is to be understood that the foregoing general description and the following detailed description are exemplary and explanatory but are not to be restrictive of the invention. The accompanying drawings which are incorporated in and constitute a part of the invention, illustrate embodiments of the invention and, together with the description, serve to explain the principles of the invention in general terms. Incidentally, like numerals refer to like parts throughout the disclosure.

DETAILED DESCRIPTION OF THE PREFERRED EMBODIMENTS

A description of a fuel cell system and method in accordance with each of embodiments of the present invention will be in detail given below suitably with reference to the accompanying drawings by exemplifying a structure applied to a vehicle.

First, a fuel cell system and method of the first embodiment of the present invention is described in detail with reference to FIGS. 2 to 4.

Figure 2:
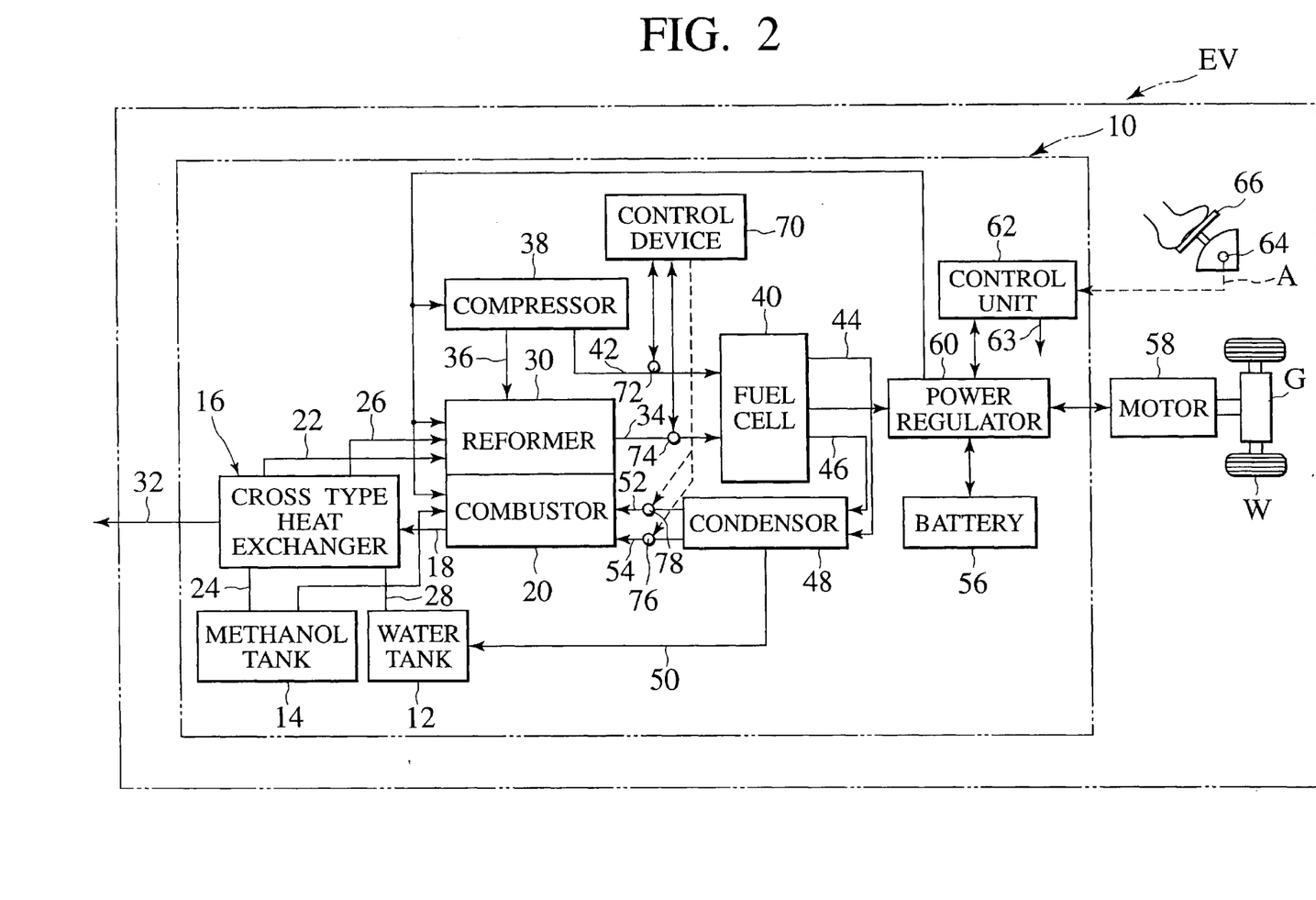
FIG. 2 is a block diagram of a basic structure of a fuel cell powered vehicle provided with a fuel cell system of the first embodiment according to the present invention.

Referring now to FIG. 2, there is shown a fuel cell powered vehicle EV equipped with a fuel cell system 10 of a preferred embodiment according to the present invention. The fuel cell system 10 includes a water tank 12 and a methanol tank 14, both of which are connected to a cross type heat exchanger 16. The cross type heat exchanger 16 is supplied with heating gas 18 from a combustor 20, and produces methanol vapor 22 from methanol 24 delivered from the methanol tank 14, and steam 26 generated from feed water 28 delivered from the water tank 12. The methanol vapor 22 and the steam 26 are supplied to a reformer 30 from the cross type heat exchanger 16, and exhaust gases 32 are exhausted from the cross type heat exchanger 16 to the atmosphere.

The reformer 30 functions to reform the methanol vapor 22 with the steam 26 by endothermic reaction, thereby producing reformed gas 34 mainly containing hydrogen. To this end, the reformer 30 may be supplied with compressed air 36 from a compressor 38 in order to partially oxidize the methanol vapor 22 for reforming the same by exothermic reaction.

The fuel cell system 10 further includes a fuel cell 40 that has an anode and a cathode, to which the compressed air 42 and the reformed gas 34 are supplied from the compressor 38 and the reformer 30, respectively. Thus, electric power is generated by the fuel cell 40 with the use of hydrogen contained in the reformed gas 34 and oxygen contained in the compressed air 42. Since all of the hydrogen contained in the reformed gas 34 and the compressed air 42, are not consumed, and exhaust air 44 and exhaust reformed gas 46 emitting from the fuel cell 40 are returned to the combustor 20 via a condenser 48.

The condenser 48 includes a water cooler (not shown) by which the exhaust air 44 and the exhaust reformed gas 46 are cooled with water coolant to condense the steam remained in the exhaust air 44 and the exhaust reformed gas 46 and produces condensed water 50 which is returned to the water tank 12.

The combustor 20 is supplied with cooled reformed gas 52 and cooled exhaust air 54, and combusts these gases to produce the heating gas 18 which is supplied to the cross type heat exchanger 16. Also, the heat generated by the combustor 20 due to combustion is recycled as a heat source to generate the methanol vapor 22 from the methanol 24 and the steam 26 from the feed water 28 in the cross type heat exchanger 16. The resultant methanol vapor and steam will be used for the endothermic reaction in the reformer 30.

The fuel cell system 10 further includes a battery 56, which is connected to an electric motor 58 via a power regulator 60. The electric motor 58 functions as a motor/generator adapted to provide a drive power to propel drive wheels W via a reduction gear G and to generate a regenerative electric power during deceleration of the vehicle EV. The battery 56 is charged with the electric power generated by the fuel cell 40 and regenerative power produced by the electric motor 58 during decelerating movement of the fuel cell powered vehicle EV. The battery 56 serves in compensational to supply additional electric power to the electric motor 58 in the event that the amount of electric power generated by the fuel cell 40 is insufficient to meet complete operation of the electric motor 58 to propel the vehicle EV and also to supply auxiliary electric power to operate various accessories such as the combustor 20, the reformer 30 and the compressor 38, etc. in the event that the amount of electric power generated by the fuel cell 40 is insufficient to meet complete operations thereof.

A control unit 62 is connected to a position sensor 64 coupled to an accelerator pedal 66 and producing a stroke detection signal A. The stroke detection signal A corresponds to a demanded amount of the steam to be required by the fuel cell 40 to quickly respond to the load variations of the vehicle EV and varies according to depressed stroke of the accelerator pedal 66. Namely, when the accelerator pedal 66 is deeply depressed to a maximum value during acceleration of the vehicle EV, the stroke detection signal A has a maximum voltage representing a maximum demand of each of the methanol vapor 22 and steam 26 to be supplied to the reformer 30 that produces a maximum amount of the reformed gas 34 to be supplied to the fuel cell 40 that produces a maximum power output. When, in contrast, the accelerator pedal 64 is released during light load, then, the stroke detection signal A has a decreased voltage value representing a decreased demand of each of the methanol vapor 22 and steam 26 to be supplied to the reformer 30 such that the amount of the reformed gas 34 produced by the reformer 30 is decreased to reduce the amount of electric power produced by the fuel cell 40. Further, the control unit 62 is responsive to the stroke detection signal A and produces a control signal to control the power regulator 60 such that power distribution as to the electric power from the fuel cell 40 and that from the battery 56 is adjusted. Namely, the power regulator 60 responds to the control signal and regulates the electric power to be delivered from the fuel cell 40 and the battery 56.

The fuel cell system 10 also includes a control device 70, first and second pressure sensors 72 and 74, and pressure regulator valves 76 and 78. The pressure sensors 72 and 74 are located in conduits for the compressed air 42 and the reformed gas 34, respectively, to produce first and second pressure detection signals. The pressure regulator valves 76 and 78 are located in conduits for the exhaust reformed gas 52 and the exhaust air 54 to regulate the flow rates of these gases, respectively. The control device 70 responds to the first and second pressure detection signals and varies the opening degrees of the pressure regulator valves 76 and 78, respectively, to regulate the flow rates of the exhaust reformed gas 52 and the exhaust air 54 to be supplied to the combustor 20 such that the operating pressure of the fuel cell 40 is controlled.

The operating pressure of the fuel cell 40 is controlled at a predetermined value to provide a maximum operating performance in dependence on varying operating loads of the fuel cell system 10. For example, if the load of the fuel cell system 10 is high, the fuel cell 40 is operated with increased operating pressure to thereby produce maximum electric power. In contrast, if the load of the fuel cell system 10 is low, then, the fuel cell 40 is operated with decreased operating pressure to thereby increase the operating efficiency of the fuel cell system 10.

Figures 3A, 3C:
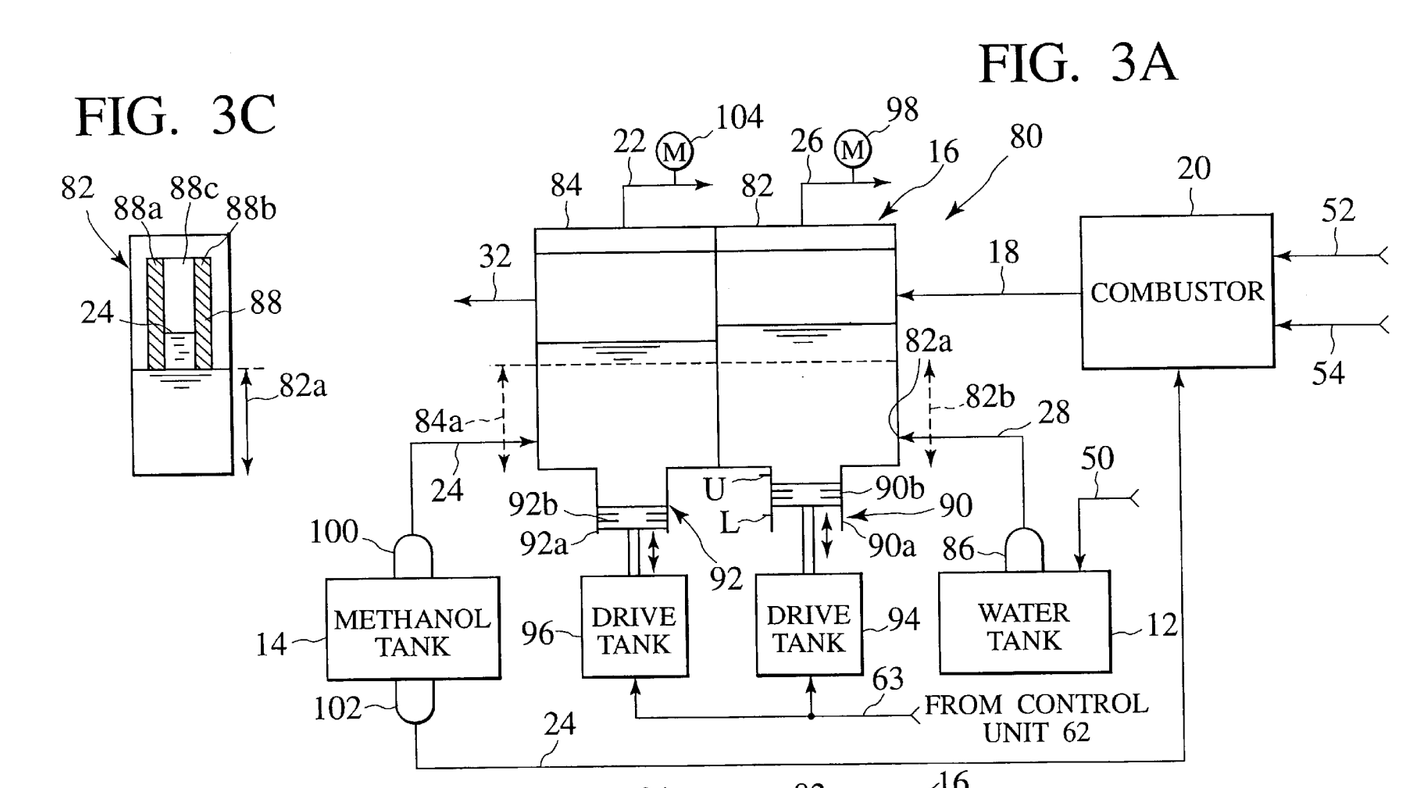
FIG. 3A is a schematic view of a cross type heat exchanger employed in the fuel cell system according to the embodiment.
FIG. 3C is a plan view of a first cross type heat exchanger of the heat exchanger of FIG. 3A.

Referring now to FIG. 3, there is shown a detailed structure of an evaporator 80 composed of the cross type heat exchanger 16 employed in the fuel cell system 10 shown in FIG. 2.

As shown in FIG. 3A, the cross type heat exchanger 16 includes a first cross type heat exchanger 82 arranged to heat the feed water 28 with heating gas 18 delivered from the combustor 20 to generate the steam 26, and a second cross type heat exchanger 84 arranged to heat methanol 24 with the heating gas 18 to generate the methanol vapor 22. Since the first and second cross type heat exchangers 82 and 84 have the same structure and operation, that is, the water supplying system and methanol supplying system are similar, the first cross type heat exchanger 82 will be representatively described in detail below and a description of the second cross type heat exchanger 84 will be omitted for clarity.

The first cross type heat exchanger 82 has at its lower portion formed with a liquid sump section 82a to store the feed water therein that is supplied from the water tank 12 via the water feed pump 86. As best seen in FIGS. 3B and 3C, an upper portion of the first cross type heat exchanger 82 has a heat exchanger section 88 adapted to evaporate the feed water 28 in the liquid sump section 82a with heating gas 18 supplied by the combustor 20.

Figure 3B:
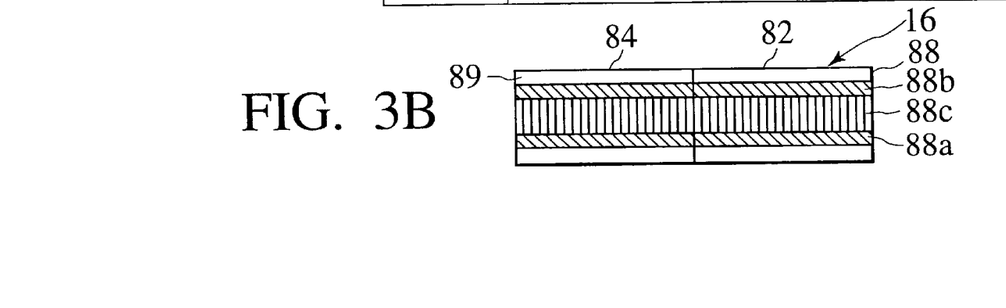
FIG. 3B is a side view of first and second cross type heat exchangers of the heat exchanger of FIG. 3A.

As clearly seen in FIGS. 3B and 3C, the heat exchanger section 88 has first and second pluralities of heat pipes 88a, 88b extending along the length of the cross type heat exchanger 82, and a plurality of transversely extending heat fins 88c connected to the first and second heat pipes 88a, 88b and having heat transfer surfaces to effect heat exchange with the feed water.

A lower portion of the liquid sump section 82a has a first volume control device 90 composed of a movable mechanism that includes downwardly extending cylinder 90a and a piston 90b slidably disposed in the cylinder 90a. The piston 90b is mechanically coupled to a drive unit 94 that moves the piston 90b upward or downward in vertical direction to vary the volume of the liquid sump section 82a. The drive unit 94 responds to a control signal 63 delivered from the control unit 62 (see FIG. 2) to move the piston 90b at varying strokes. The water feed pump 86 supplies the feed water 28 to the liquid sump section 82a at an amount sufficient for generating the steam demanded for necessary electric power corresponding to the depressed stroke of the accelerator pedal 66 (see FIG. 2).

The heating gas 18 exhausted from the combustor 20 flows into the heat exchanger section 88 of the cross type heat exchanger 82 such that the heating gas 18 has the heating value to form the steam 26 from the feed water remained in the heat exchanger section 82. This steam 26 is delivered to the reformer 30 as already described above. A flow sensor 98 is provided to monitor the flow rate of the steam 26 to be supplied to the reformer 30 from the cross type heat exchanger 82. The second cross type heat exchanger 84 produces the methanol vapor 22, that is monitored by a flow sensor 104 adapted to produce a detection signal to be applied to the control device 70.

Besides, in addition to the control of the water feed pump 86, the amount of the feed water remaining in the liquid sump section 82a is controlled for a specific reason described below.

In the event that the water feed pump 86 has a low water feed capacity and a water feed opening 82b formed in the liquid sump section 82a has a small cross sectional area, there exists only a few water level variations within the heat exchanger section 88. And usually, the amount of the feed water 28 supplied by the pump 86 is selected to have a value determined by the amount of the steam demanded by the depressed stroke of the accelerator pedal 64. Therefore only together with such a mechanism, an excessively long response time is required to vary the amount of the feed water in the liquid sump section 82a at a demanded flow rate.

In this embodiment of the invention discussed above, the response time is shortened by varying the amount of the feed water remaining in the liquid sump section 82a with the use of the cylinder 90a and the piston 90b vertically movable upward or downward therein. Thus, the water feed pump 86 itself is not required to change its maximum flow rate and the response time for the water level variations can be reliably improved without an increase in the size and capacity of the water feed pump 86.

Likewise as shown in FIG. 3A, with respect to the methanol tank 14, first and second methanol feed pumps 100 and 102 are coupled to the methanol tank 14 to supply methanol 24, 24 to the second cross type heat exchanger 84 and the combustor 20, respectively.

Now, a driving control process of the piston 90b will be described in detail below. Namely, the relationship between a deviation ΔQ and a moving speed of the piston 90b will be described in detail below with reference to a control map of FIG. 4 wherein the horizontal axis indicates the deviation ΔQ and the vertical axis indicates the moving speed of the piston 90b.

Initially, the position sensor 64 generates a stroke detection signal A representing the demanded amount of the steam required for the fuel cell 40 determined by the depressed stroke of the accelerator pedal 66. The control unit 62 responds to the stroke detection signal A to produce the control signal, by which the drive unit 94 is controlled.

The control unit 62 includes a computing circuit (not shown) to calculate a demanded amount Q1 of the steam required for the fuel cell system 10 in response to the stroke detection signal A. Namely, the control unit 62 functions to calculate the deviation ΔQ on the basis of the demanded amount Q1 of the steam and a real amount Q2 of the steam currently measured by the flow sensor 98 in a manner as expressed by the following equation:

$$\Delta Q = Q1 - Q2.$$

Figure 4:
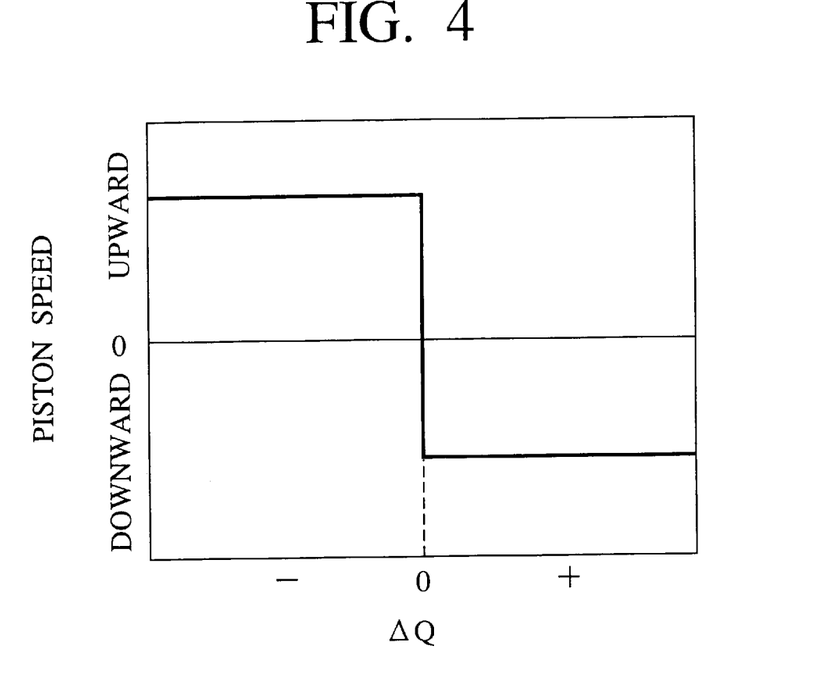
FIG. 4 is a control map illustrating the relationship between a deviation and a piston speed according to the embodiment.

If this deviation ΔQ is positive, the control unit 62 generates a control signal to cause the drive unit 94 to operate such that the piston 90b is moved downward to lower the water level in the liquid sump section 82a with a constant speed as shown FIG. 4.

In contrast, if the deviation ΔQ is negative, then, the control unit 62 generates a control signal to cause the drive unit 94 to operate such that the piston 90b is moved upward to raise the water level in the liquid sump section 82a with a constant speed as shown FIG. 4.

Likewise, the liquid sump section 84a includes a second volume control device 92 composed of a downwardly extending cylinder 92a and a piston 92b slidably received in the cylinder 92a to vary the volume of the liquid sump section 84a. The drive unit 96 is operated in the same manner as discussed above with respect to the drive unit 94 by the action of the control unit 62 to vary the volume of methanol in the liquid sump section 84a of the second cross type heat exchanger 84 to provide a demanded amount of the methanol vapor to meet load variations.

With such a control process, the control unit 62 controls the operation of the drive unit 94 such that the volume of the liquid sump section 82a is varied in dependence on the deviation ΔQ between the demanded amount Q1 of the steam determined by the depressed stroke of the accelerator pedal 66 and the real amount Q2 of currently flowing steam, thereby obtaining a required amount of fuel evaporation to supply the methanol vapor and the steam at required amounts to the reformer 30 in quick response to load variations.

Incidentally, in the event that the piston 90b moves to a position beyond a given upper limit U in FIG. 3, since the heating value of the heating gas 18 becomes insufficient to produce the demanded amount of the steam from the feed water 28, the control unit 62 can control in such a manner that a methanol feed pump 102 is operated to additionally supply methanol to the combustor 20(see FIG. 3) such that the flow rate of the heating gas 18 is increased to thereby increase the heating value to be supplied to the cross type heat exchanger 16.

On the other hand, if the piston 90b is moved downward to a position below a lower limit L in FIG. 3, an excessive amount of the feed water remains in the liquid sump section 82a, and the control unit 62 can control in such a manner that the water feed pump 86 is operated to return the feed water 28 from the liquid sump section 82a to the water tank 12 for thereby reducing the amount of the feed water remaining in the liquid sump section 82a such that it is possible to supply a decreased amount of the heating value to the cross type heat exchanger 16.

As discussed above, in the embodiment, since the cross type heat exchanger 16 is provided with the liquid sump sections 82a and 84a provided in the vicinity of the heat exchanger sections 88 and 89, respectively, and the liquid sump sections 88 and 89 have the first and second volume control devices 90 and 92, respectively, which are controlled by the control unit 62, the respective volumes can be reliably regulated by the drive units 94 and 96, respectively, in quick response to the load variations for thereby enabling the supply of the demanded amounts of the steam and the methanol vapor to the reformer 30.

Figure 5:
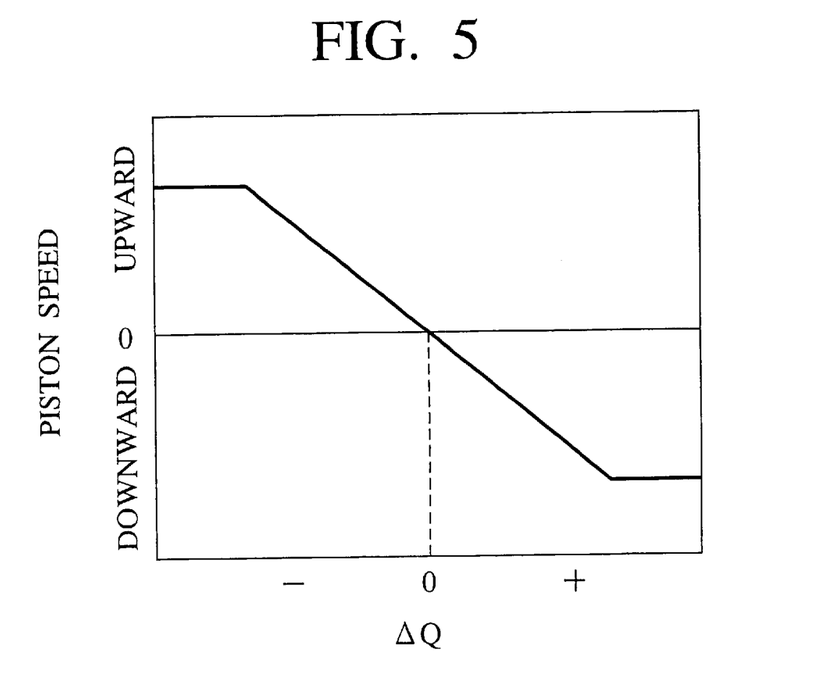
FIG. 5 is a control map illustrating the relationship between the deviation and the piston speed of a fuel cell system according to the second embodiment of the present invention.
Figure 6A:
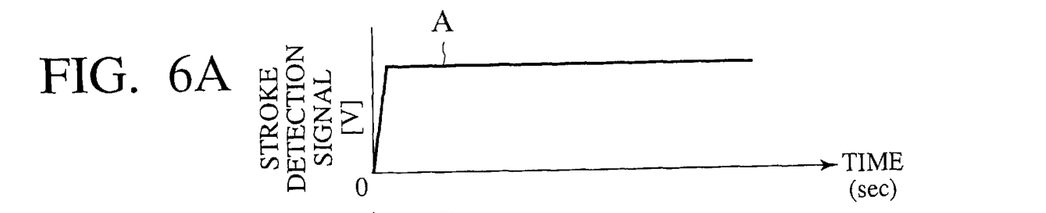
FIGS. 6A to 6F illustratively shows a stroke detection signal, demanded amount of steam, evaporation speed, real amount of steam, amount of feed water, and real amount of steam in order.
Figure 6B:
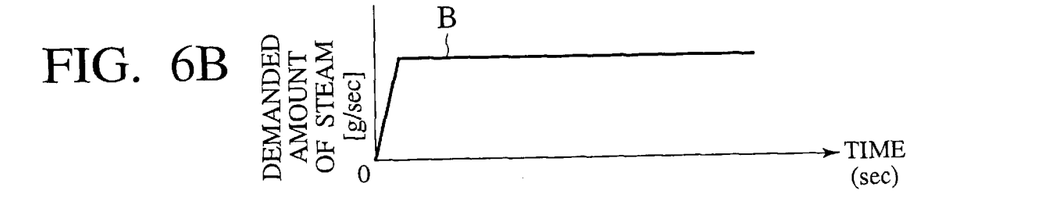
Figure 6C:
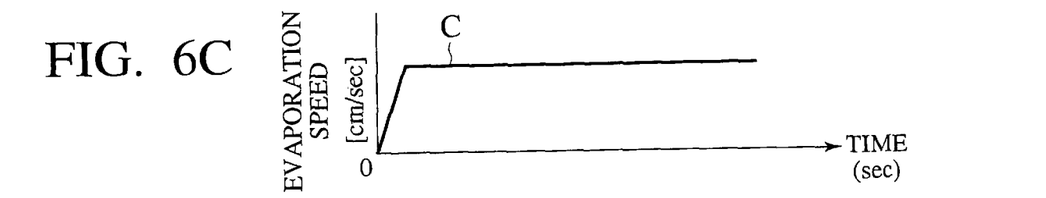
Figure 6D:
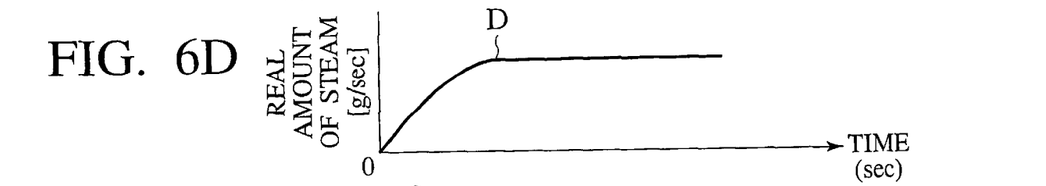
Figure 6E:
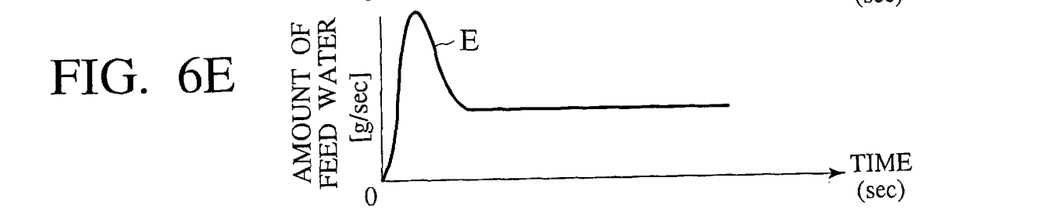
Figure 6F:
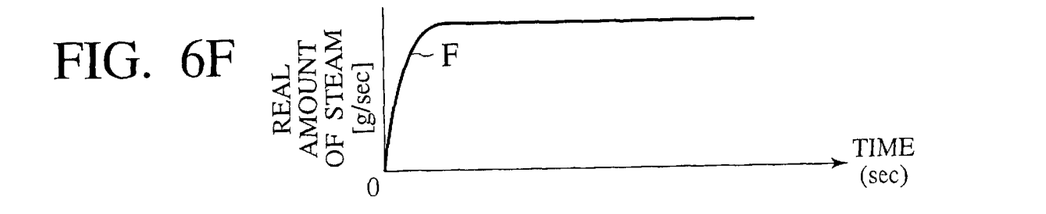

Next, a fuel cell system and method of the second embodiment of the present invention is described in detail also with reference to FIGS. 5 to 6F.

Especially, this embodiment relates to another driving method of the piston 90b, which is achieved in the fuel cell system 10 shown in FIGS. 2 and 3.

In this embodiment also, when the accelerator pedal 66 is depressed in a manner as shown in FIG. 2, the position sensor 64 detects the depressed stroke of the accelerator pedal 66, thereby producing a stroke detection signal A in response thereto. This stroke detection signal A is applied to the control unit 62, which produces a control signal 63 by which the drive units 94 and 96 are controlled.

In the control unit 62, the computing circuit calculates the demanded amount Q1 of the steam required for the fuel cell system 10 in response to the depressed stroke of the accelerator pedal 66. Then, the computing circuit calculates the deviation ΔQ on the basis of the demanded amount Q1 of the steam and the real amount Q2 of the steam currently measured by the flow rate sensor 98 in a manner as expressed by the following equation:

ΔQ=Q1−Q2.

If the ΔQ is positive, as shown FIG. 5, the piston 90b is moved downward to lower the level of the feed water remaining in the heat exchanger section 88 of the cross type heat exchanger 82.

In contrast, if the ΔQ is negative, as shown FIG. 5, the piston 90b is moved upward to thereby raise the water level in the heat exchanger section 88.

Now, the relationship between deviation ΔQ and the moving speed of the piston 90b will be described in detail with reference to a control map in FIG. 5 and also FIGS. 6A to 6F.

An essential feature of the driving method in this embodiment resides in the fact that the piston 90b is moved upward and downward at a higher speed as the deviation A Q increases.

Namely, when the stroke detection signal A is produced by the position sensor 64 as shown in FIG. 6A, the control unit 62 produces the control signal representing the demanded amount of the feed water corresponding to the demanded amount B (g/sec) of the steam, as shown in FIG. 6B, in response to the stroke detection signal A.

Here, in the event that the feed water is supplied to the first cross type heat exchanger 82 in FIG. 3 in the same method as discussed above with respect to the first embodiment, the evaporation speed C (cm/sec) is constant as shown in FIG. 6C. Accordingly, the real amountD (g/sec) of the steam supply varies in a gradual slope as shown in FIG. 6D and, therefore, there exits a time delay between the demanded amount B (g/sec) of the steam and the real amount D (g/sec) of the steam during a load increase.

In this embodiment, in the event that it is required to rapidly increase the amount of the steam when, for example, the accelerator pedal 66 is deeply depressed, namely, when the deviation ΔQ is large, the piston 90b is moved upward at high speed as shown in FIG. 5. When this happens, the amount E of the feed water 28 to be supplied to the first cross type heat exchanger 82 is enabled to overshoot as shown in FIG. 6E.

Accordingly, the amount of overshooting in the feed water is controlled in a manner discussed above, the real amount F (g/sec) of the steam to be currently supplied to the reformer 30 varies in a manner as shown in FIG. 6F, and therefore, it is possible to supply a demanded amount of the steam in quick response to the reformer 30 even during rapid load variations.

While, in each of the embodiments discussed above, the first and second volume control devices 90 and 92 have been shown and described as including the cylinders 90a and 92a and the pistons 90b and 92b associated therewith, respectively, to control the volumes of the liquid sump sections 82a and 84a of the first and second cross heat exchangers 82 and 84, the present invention is not limited thereto and various other modifications may be made without departing from the spirit of the invention.

Figure 7:
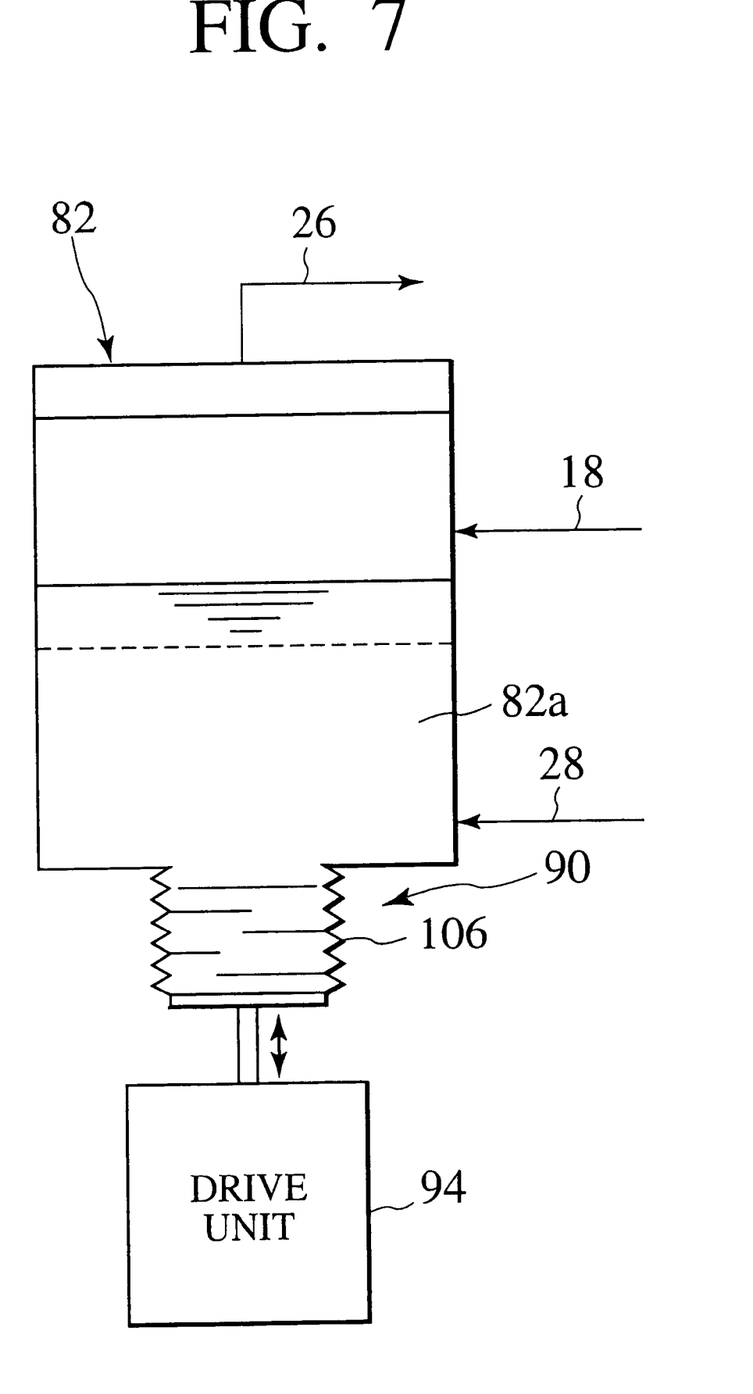
FIG. 7 is a schematic view of a modified structure of the cross type heat exchanger of FIG. 3.

A preferred example of such modifications is illustrated in FIG. 7, with the same parts bearing the same reference numerals as those used in the above embodiments. In FIG. 7, the first volume control device 90 includes an actuator composed of a flexible bellows 106 located at a bottom of the liquid sump section 82a of a first cross type heat exchanger 82. The bellows 106 is connected at its lower end to the drive unit 94 and is vertically movable upward or downward, thereby varying the volume of the liquid sump section 82a to regulate the amount of the feed water 28 to be supplied thereto. This modification is advantageous in that the demanded amount of the steam can be supplied to the reformer during the load variations in quick response thereto, too.

Figure 8:
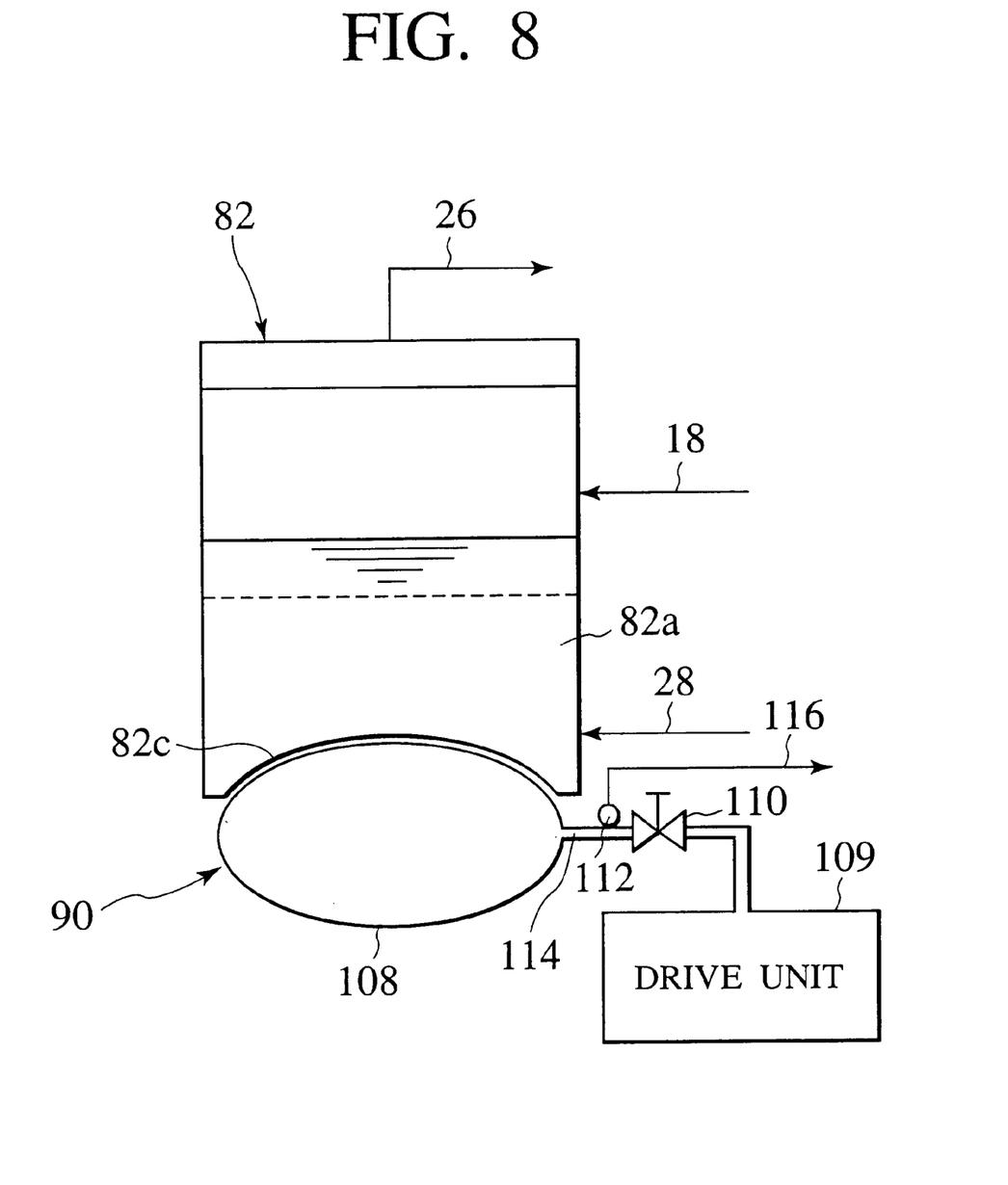
FIG. 8 is a schematic view of another modified structure of the cross type heat exchanger of FIG. 3.

Another preferred example of the above discussed modifications is illustrated in FIG. 8, with like parts bearing the same reference numerals as those used in the above embodiments. In FIG. 8, the volume control device 90 includes a flexible bottom member 82c formed at a bottom end of the liquid sump section 82a of a first cross type heat exchanger 82 and a flexible air bag 108 connected to a drive unit 109 via an electromagnet valve 110. A pressure sensor 112 is located between the air bag 108 and the electromagnetic valve 110 to detect the pressure of fluid flowing through a conduit 114, thereby producing a pressure detection signal 116 that is applied to the control unit 62. The drive unit 109 supplies fluid such as air or liquid under pressure to the air bag 108 at a flow rate determined by the opening of the electromagnetic valve 110 which is regulated in response to the control signal delivered from the control unit 62, thereby varying the change in volume of the liquid sump section 82a to regulate the amount of the feed water 28 to be supplied thereto. The control unit 62 may be arranged such that it responds to the pressure detection signals 116 to vary the opening degree of the electromagnet valve 110 for thereby adjusting the speed in change of the volume of the air bag 108.

While in the embodiments as discussed above, further, the cross type heat exchanger 16 has been shown and described as including the liquid sump section 82a having the variable volume to regulate the amount of the feed water to be supplied to the heat exchanger 88, the present invention is not limited thereto and a modification may be made such that a distance between the heat exchanger section 88 and the liquid sump section 82a is controlled so as to directly lower the heat exchange section 88 into the liquid sump section 82a for thereby increasing the amount of the feed water to be brought into contact with an evaporating heat transfer surface of the heat exchanger section 88.

While in the embodiments as discussed above, the evaporator 80 composed of the cross type heat exchanger 16 having the first and second cross type heat exchangers 82 and 84 separated from each other is used, an evaporator including a single heat exchanger for mixture of water and methanol or the like may be replaced.

Incidentally, although the methanol 24 is typically used in the embodiments as discussed above, another material for producing reformed gas containing hydrogen may be used.

The entire content of a Patent Application No. TOKUGAN 2000-15791 with a filing date of Jan. 25, 2000 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A fuel cell system, comprising:
   a fuel cell generating electric power;
   a combustor producing heating gas;
   an evaporator including an evaporating heat transfer surface evaporating fuel with the heating gas to produce fuel vapor, the evaporator including a liquid sump section located in the vicinity of the evaporating heat transfer surface and having a variable volume to vary an amount of liquid in the liquid sump section;
   a volume control device associated with the liquid sump section to control the volume thereof such that a demanded amount of the fuel vapor is obtained; and
   a reformer reforming the fuel vapor to produce reformed gas;
   wherein the fuel cell is supplied with the reformed gas and a gas containing oxygen to generate the electric power.

2. A fuel cell system according to claim 1, wherein the volume control device includes a drive unit driving the volume control device to vary the volume of the liquid sump section, and a control unit coupled to the drive unit and controlling the drive unit such that the volume control device adjusts the volume of the liquid sump section to cause the evaporator to produce the demanded amount of the fuel vapor.

3. A fuel cell system according to claim 2, wherein the volume control device includes a movable member operated by the drive unit.

4. A fuel control system according to claim 3, wherein the movable member includes a piston coupled to the drive unit to vary the volume of the liquid sump section in dependence on drive power produced by the drive unit.

5. A fuel cell system according to claim 3, wherein the movable member includes a flexible bellow coupled to the drive unit to vary the volume of the liquid sump section in dependence on drive power produced by the drive unit.

6. A fuel cell system according to claim 1, further comprising:
   a stroke detector detecting a depressed stroke of an accelerator pedal to produce a stroke detection signal; and
   a flow rate detector detecting flow rate of the fuel vapor to produce a flow rate detection signal;
   wherein the volume control device is responsive to the stroke detection signal and the flow rate detection signal to calculate a deviation between a demanded amount of the fuel vapor represented by the stroke detection signal and a real amount of the fuel vapor represented by the flow rate detection signal, and the volume control device controls the volume of the liquid sump section in dependence on the deviation.

7. A fuel cell system according to claim 1, wherein when a heating value of the heating gas becomes insufficient to produce the demanded amount of fuel vapor, a flow rate of the heating gas is increased, and when an excessive amount of the fuel remains in the liquid sump section, an amount of the fuel remaining in the liquid sump section is reduced.

8. A fuel cell system according to claim 1, wherein the combustor uses exhaust gas produced by the fuel cell.

9. A fuel cell system according to claim 1, wherein the evaporator is a heat exchanger.

10. A fuel cell system, comprising:
    a fuel cell generating electric power;
    a combustor producing heating gas;
    an evaporator including an evaporating heat transfer surface evaporating fuel with the heating gas to produce fuel vapor, the evaporator including a liquid sump section located in the vicinity of the evaporating heat transfer surface and having a variable volume;
    a volume control device associated with the liquid sump section to control the volume thereof such that a demanded amount of the fuel vapor is obtained; and
    a reformer reforming the fuel vapor to produce reformed gas,
    wherein the fuel cell is supplied with the reformed gas and a gas containing oxygen to generate the electric power,
    wherein the volume control device includes a drive unit driving the volume control device to vary the volume of the liquid sump section, and a control unit coupled to the drive unit and controlling the drive unit such that the volume control device adjusts the volume of the liquid sump section to cause the evaporator to produce the demanded amount of the fuel vapor,
    wherein the volume control device includes a movable member operated by the drive unit, and wherein the movable member includes an air bag varying the volume thereof and coupled to the drive unit to vary the volume of the liquid sump section in dependence on drive power produced by the drive unit.

11. A fuel cell system according to claim 10, wherein the drive unit includes a fluid actuator connected to the air bag.

12. A fuel cell system according to claim 10, wherein a bottom portion of the liquid sump section has a flexible member in correspondence with the air bag.

13. A fuel cell system, comprising:

a fuel cell generating electric power;

a combusting means for producing heating gas;

an evaporating means for evaporating fuel with the heating gas to produce fuel vapor, the evaporating means including a liquid sump section located in the vicinity of the evaporating heat transfer surface and having a variable volume to vary an amount of liquid in the liquid sump section;

a volume control means, associated with the liquid sump section, for controlling the volume thereof such that a demanded amount of the fuel vapor is obtained; and a reforming means for reforming the fuel vapor to produce reformed gas;

wherein the fuel cell is supplied with the reformed gas and a gas containing oxygen to generate the electric power.

14. A controlling method of a fuel cell system, comprising:

producing heating gas;

evaporating fuel in a liquid sump section of the fuel cell system with the heating gas to produce fuel vapor, while controlling a volume of the liquid sump section such that a demanded amount of the fuel vapor is obtained, the liquid sump section having a variable volume to vary an amount of liquid in the liquid sump section;

reforming the fuel vapor to produce reformed gas; and supplying the reformed gas and a gas containing oxygen such that the fuel cell generates electric power.

15. The method of claim 14, further comprising:

increasing a flow rate of the heating gas when a heating value of the heating gas becomes insufficient to supply a sufficient amount of the reformed gas.

16. The method of claim 14, further comprising:

reducing an amount of fuel in the liquid sump section when an excessive amount of the fuel remains in the liquid sump section.

* * * * *